April 3, 1928.
J. W. MEADOWCROFT
ELECTRIC WELDING MACHINE
Filed Nov. 24, 1925
1,665,066
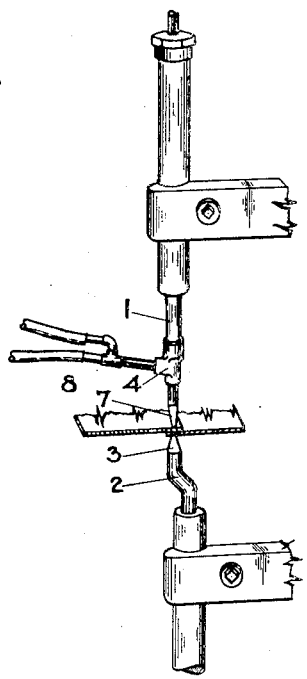
FIG.1
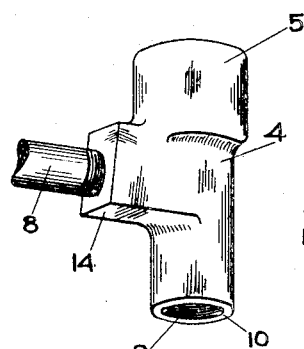
FIG.2
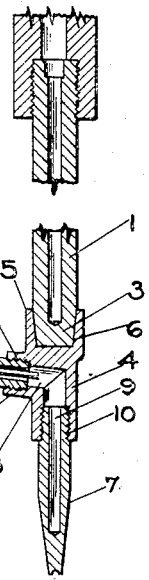
FIG.3
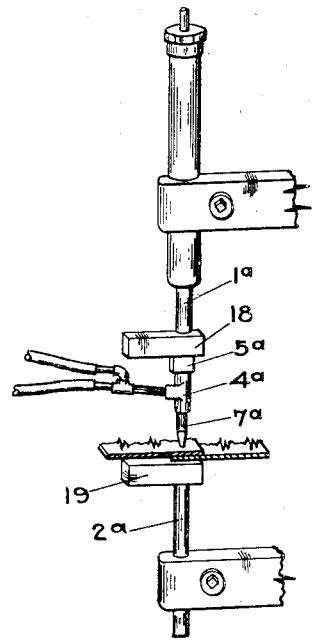
FIG.4
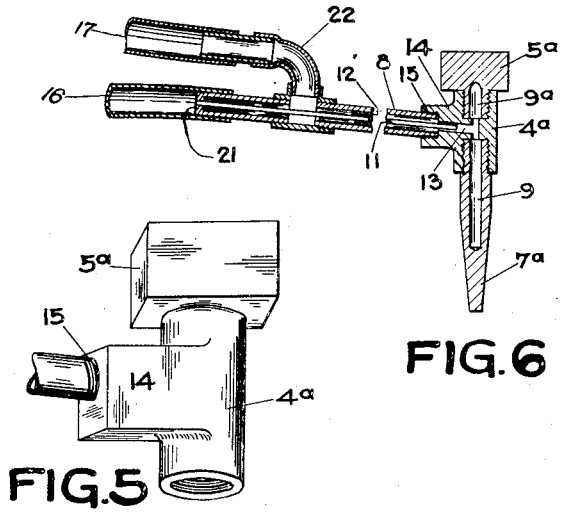
FIG.5
FIG.6
INVENTOR.
JOSEPH W. MEADOWCROFT
ATTORNEY.

Patented Apr. 3, 1928.

1,665,066

UNITED STATES PATENT OFFICE.

JOSEPH W. MEADOWCROFT, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

ELECTRIC WELDING MACHINE.

Application filed November 24, 1925. Serial No. 71,039.

My invention relates to apparatus for electric welding and particularly to that type designed for spot welding, and the object of the invention is to provide certain improvements in welding machines of that character, whereby the operation thereof is rendered more convenient and efficient and the range of utility increased.

Another object of the invention is to provide means for easily and quickly varying the welding contact with the work to suit the contour of the latter and also to produce the desired size or area of weld, without the necessity of removing either of the two electrodes or terminals of the machine.

A further object of the invention is to provide an auxiliary electrode or welding tool separate from the two electrodes of the machine and adapted to be inserted, as desired, between one of such electrodes and the work and shaped for contact with work of a given contour and also to afford a desired area of contact therewith, the auxiliary electrode being portable and susceptible of being conveniently manipulated by the operator of the machine and readily inserted in or removed from position without interfering with the operation of the machine.

A further object of the invention is to provide means for cooling the auxiliary electrode to prevent it from becoming overheated during use and interfering with the proper formation of the weld, and also to arrange such cooling means so as not to interfere with the portability and free manipulation of this separate electrode.

With these and other objects in view, the invention comprises the various novel features of construction and arrangement hereinafter set forth and illustrated in the accompanying drawing, in which—

Figure 1 is a fragmentary perspective view of a welding machine, illustrating one embodiment of my invention;

Fig. 2 is an enlarged fragmentary perspective view of the auxiliary electrode with the tip removed;

Fig. 3 is a longitudinal section partially broken away, showing the auxiliary electrode applied to one of the electrodes of the welding machine;

Fig. 4 is a fragmentary perspective view of a welding machine, showing another embodiment of my invention;

Fig. 5 is an enlarged fragmentary perspective view of the modified form of auxiliary electrode shown in Fig. 4; and Fig. 6 is a longitudinal section of such modified form of auxiliary electrode.

Similar numerals refer to similar parts throughout the several views.

Referring to the embodiment of the invention illustrated in Figs. 1, 2 and 3 of the drawing, the numerals 1 and 2 indicate respectively the electrodes or terminals of the spot welding machine which are arranged with their adjacent ends in longitudinal alinement and one of which is movable longitudinally toward and away from the other. According to the usual construction, the electrodes are shown in a substantially vertical line with their opposite ends tapered or of frusto-conical form as indicated at 3, and the upper electrode 1 is movable relatively to the lower or fixed electrode 2; but this arrangement, while preferred, is not essential. When the movable electrode is advanced to co-act with the fixed electrode, the ends 3 are designed to bear upon and form electrical contact with the opposite faces of the interposed lapped portions of metal sheets to be united, the movable electrode applying the pressure necessary to accomplish the weld. As the invention does not relate to the parts of the machine beyond the electrodes, such parts have been omitted with the understanding that any suitable construction may be employed.

In carrying out my invention I provide a portable auxiliary electrode 4 separate from the electrodes 1 and 2 and adapted to be inserted therebetween and applied to the end of one of the same and preferably to the movable electrode 1, as shown in Figs. 1 and 3. At one end this auxiliary electrode is formed with a hollow head 5 having an outwardly opening socket 6 arranged to receive the end of the electrode 1 to permit the auxiliary electrode to be conveniently fitted thereon and moved forward therewith, the socket being preferably tapered to correspond with the the tapered end 3. The head 5 telescopes with the electrode 1 and bears against the periphery thereof to support the auxiliary electrode against lateral displacement and to cause it to be advanced in the operation of the machine in substantial alinement with the electrodes 1 and 2 and into a position in which it will co-act with the fixed electrode 2. This telescopic arrangement also provides a slip-joint between the auxiliary electrode and the electrode 1 whereby the former may be easily and quickly removed from the latter, as desired.

At its other end the auxiliary electrode is formed with a point or tip 7 which preferably is coaxial with the socket 6 and tapered as shown, and has a bearing face differing in size and contour from the bearing face of the electrode 1, so as to vary the area or the shape, or both, of the welding contact to suit the particular work to be welded. In the present instance the bearing face of the tip is represented, for the purpose of illustration, as smaller than the end face of the electrode 1, and as cupped or of concave form while the latter is flat.

A handle 8 projects laterally from the auxiliary electrode to permit it to be conveniently manipulated by the operator of the machine.

In order to prevent the auxiliary electrode from becoming too hot during the operation of the machine and interfering with the proper formation of the weld, it is formed with a cooling chamber 9 extending longitudinally thereof and into the tip 7, which for convenience is made separate from the rest of the electrode 4 and has a screw threaded connection therewith, as indicated at 10.

Suitable means are provided for effecting a circulation of water or other cooling fluid through the chamber 9, without interfering with the portability of the device and its ready manipulation by the operator. To this end the handle 8 is preferably provided with two passages 11 and 12 extending longitudinally therethrough and communicating at one end with a laterally disposed portion 13 of the cooling chamber, which opens outwardly through a nipple 14 into which the front end of the handle 8 is screw threaded, as indicated at 15. One of these passages serves as an inlet for the cooling chamber, and the other as an outlet. Flexible tubes 16 and 17 are attached to the rear end of the handle and communicate respectively with the passages 11 and 12, the tube which is associated with the passage forming the inlet, conducting the cooling fluid from a suitable source (not shown) and the other tube leading to a suitable point of discharge.

In another embodiment of my invention as shown in Figs. 4, 5 and 6, the movable and fixed electrodes 1ª and 2ª of the machine have bearing surfaces of much larger area than the spots to be welded, and for this purpose may be provided at their ends with laterally extended members 18 and 19. In this instance, the auxiliary electrode 4ª is provided at its upper end with a solid head 5ª having a flat upper face adapted to contact with and receive impact from the movable electrode 1ª. By virtue of the relatively large bearing surfaces provided by the members 18 and 19, the auxiliary electrode may be shifted laterally over the work and relatively to the electrodes 1ª and 2ª to effect a plurality of separate spot welds without changing the position of the work in the machine.

The cooling chamber 9 is preferably extended upwardly toward and into the head 5ª, as indicated at 9ª, and for convenience the head may be formed separately from the body of the auxiliary electrode and assembled therewith by means of a screw threaded connection.

In Fig. 6 I illustrate in detail one form of handle construction for providing the inlet and outlet passages for the cooling chamber. The handle is of tubular form and has a smaller tube extending longitudinally therethrough and providing the passage 11, the tube being spaced from the inner surface of the handle to form the other passage 12. The passage 12 is closed at the rear extremity of the handle, as indicated at 21, so that only the passage 11 opens outwardly therethrough and communicates with the flexible tube 16. A tubular branch 22 extends outwardly and rearwardly from the handle adjacent its rear end and communicates with the passage 12 and with the flexible tube 17. This affords a convenient arrangement of the passages for effecting circulation through the cooling chamber, while at the same time the branch 22 of the handle serves as a guard to prevent the operator's hand from slipping.

From the foregoing description the operation of the welding machine embodying my invention will be apparent, and it will be seen that the use of my auxiliary electrode increases the convenience and efficiency of the operation of the machine and also its range of utility. Furthermore, the auxiliary electrode may be readily inserted in or removed from position in the machine as occasion requires and is suitably cooled without in anywise interfering with its portability and free manipulation.

It is to be understood that various changes may be made in the form, construction and arrangement of the parts, within the scope of the invention as defined in the appended claims.

Having thus described my invention, I claim and desire to protect by Letters Patent of the United States:

1. In a spot welding machine, the combination with the electrodes thereof having welding points, of a separate auxiliary electrode telescoping with and removably fitted to one of said welding points and cooperating with the other electrode.

2. In a spot welding machine, the combination with the electrodes thereof having welding points, of a separate auxiliary electrode interposed between said electrodes and removably fitted to one of the same and having a point differing in size from the point of the electrode to which it is fitted and cooperating with the other electrode.

3. A portable auxiliary electrode for welding machines, having a body formed with a cooling chamber therein, a handle extending laterally from said body and formed with passages extending therethrough and communicating with said chamber and constituting an inlet and an outlet therefor, and flexible tubes attached to said handle in communication with said inlet and outlet respectively, for circulating a cooling fluid through said chamber.

4. In a spot welding machine, the combination with the electrodes thereof, of a third electrode having independent cooling means, and removably connected with one of the first named electrodes.

5. In a spot welding machine, the combination with the electrodes thereof, of an independently cooled electrode having a base recessed to telescope upon the point of another electrode.

In testimony whereof I hereunto affix my signature.

JOSEPH W. MEADOWCROFT.